(12) United States Patent
Ueda

(10) Patent No.: US 12,664,737 B2
(45) Date of Patent: Jun. 23, 2026

(54) HEAD MOUNTED DISPLAY OF VIDEO SEE-THROUGH TYPE

(71) Applicant: CANON KABUSHIKI KAISHA, Tokyo (JP)

(72) Inventor: Toshiharu Ueda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 137 days.

(21) Appl. No.: 18/421,193

(22) Filed: Jan. 24, 2024

(65) Prior Publication Data

US 2024/0265644 A1 Aug. 8, 2024

(30) Foreign Application Priority Data

Feb. 7, 2023 (JP) ................................. 2023-016786

(51) Int. Cl.
| | |
|---|---|
| *G06T 19/00* | (2011.01) |
| *G02B 27/01* | (2006.01) |
| *G06V 20/50* | (2022.01) |

(52) U.S. Cl.
CPC ........ *G06T 19/006* (2013.01); *G02B 27/0172* (2013.01); *G06V 20/50* (2022.01); *G02B 2027/0132* (2013.01); *G02B 2027/0178* (2013.01)

(58) Field of Classification Search
CPC .............. G06T 19/006; G02B 27/0172; G02B 2027/0132; G02B 2027/0178; G02B 2027/0138; G02B 2027/014; G06V 20/50
See application file for complete search history.

(56) References Cited

U.S. PATENT DOCUMENTS

| | | | | |
|---|---|---|---|---|
| 8,768,006 B2 * | 7/2014 | Subramanian | ....... | G06V 10/143 |
| | | | | 382/165 |
| 2003/0132940 A1 * | 7/2003 | Yamagata | ................. | G06T 1/20 |
| | | | | 345/428 |
| 2007/0229689 A1 * | 10/2007 | Yamada | ............... | H04N 25/443 |
| | | | | 348/311 |
| 2008/0055444 A1 * | 3/2008 | Furuta | ................ | H04N 25/7795 |
| | | | | 348/E3.016 |

(Continued)

FOREIGN PATENT DOCUMENTS

| | | | |
|---|---|---|---|
| JP | 2003244726 A | * | 8/2003 |
| JP | 2004-205711 A | | 7/2004 |

OTHER PUBLICATIONS

Yao, Ruoheng, et al. "Asynchronous double-frame-exposure binocular-camera with pixel-level pipeline architecture for high-speed motion tracking." IEEE Transactions on Circuits and Systems II: Express Briefs 69.6 (2022): 2967-2971.*

(Continued)

*Primary Examiner* — Sarah Lhymn

(74) *Attorney, Agent, or Firm* — Venable LLP

(57) ABSTRACT

A head mounted display according to the present invention is a head mounted display of a video see-through type, and includes: an image sensor configured to be able to execute, in parallel, capturing of a first image representing a real space, and capturing of a second image representing the real space; a display configured to display the first image; a detection unit configured to detect a predetermined real object from the second image; and a processor configured to perform predetermined processing based on a result of the detection of the predetermined real object.

13 Claims, 7 Drawing Sheets

(56) References Cited

U.S. PATENT DOCUMENTS

| | | | |
|---|---|---|---|
| 2011/0231737 A1* | 9/2011 | Dachiku | G06F 11/1044 |
| | | | 714/E11.049 |
| 2013/0093853 A1* | 4/2013 | Iwami | H04N 19/597 |
| | | | 348/46 |
| 2014/0340496 A1* | 11/2014 | Okawa | A61B 1/00009 |
| | | | 600/103 |
| 2018/0070009 A1* | 3/2018 | Baek | H04N 23/90 |
| 2019/0042851 A1* | 2/2019 | Varadarajan | G06V 40/20 |
| 2019/0222774 A1* | 7/2019 | Kobayashi | G06F 3/0304 |
| 2021/0286502 A1* | 9/2021 | Lemay | G06F 3/017 |
| 2021/0321074 A1* | 10/2021 | Stoner | H04N 13/111 |
| 2022/0197033 A1* | 6/2022 | Liang | H04N 13/332 |
| 2022/0206298 A1 | 6/2022 | Goodman | |
| 2023/0176659 A1* | 6/2023 | Lee | G06F 3/011 |
| | | | 345/156 |

OTHER PUBLICATIONS

Sarhangnejad, N., Katic, N., Xia, Z., Wei, M., Gusev, N., Dutta, G., . . . & Genov, R. (2019). Dual-tap computational photography image sensor with per-pixel pipelined digital memory for intra-frame coded multi-exposure. IEEE Journal of Solid-State Circuits, 54( 11), 3191-3202.*

\* cited by examiner

100

102R    Lens_r    102L    Lens_l

200

101L    110    101R

HEAD MOUNTED DISPLAY OF VIDEO SEE-THROUGH TYPE

BACKGROUND OF THE INVENTION

Field of the Invention

The present invention relates to a head mounted display of a video see-through type.

Description of the Related Art

In recent years a technique called "mixed reality (MR)" is adopted more widely. For example, a video see-through type head mounted display (HMD) has been proposed as a device using MR. In the case of the video see-through type HMD, an image of a real space (e.g., portion corresponding to the visual field (field-of-view) of a user) is captured by a camera, and an image generated by synthesizing a computer graphic (CG) with the captured image of the real space, is displayed (presented) to the user.

Japanese Patent Application Publication No. 2004-205711 discloses an HMD that includes a first camera which captures an image of a real space, and a second camera which captures images of markers to estimate a position and an attitude of the HMD. If the technique disclosed in Japanese Patent Application Publication No. 2004-205711 is used, a hand is detected from an image (picture) captured by the second camera, and, based on the detection result of the hand, a CG can be synthesized at a position of the hand in the image (picture) captured by the first camera, for example.

SUMMARY OF THE INVENTION

The present invention provides a technique to perform processing appropriately based on a position of a real object in a displayed image.

The present invention in its first aspect provides a head mounted display of a video see-through type, the head mounted display including: an image sensor configured to be able to execute, in parallel, capturing of a first image representing a real space, and capturing of a second image representing the real space; a display configured to display the first image; a detection unit configured to detect a predetermined real object from the second image; and a processor configured to perform predetermined processing based on a result of the detection of the predetermined real object.

The present invention in its second aspect provides a control method of a head mounted display of a video see-through type, the control method including: executing, in parallel, capturing of a first image representing a real space, and capturing of a second image representing the real space with an image sensor; displaying the first image; detecting a predetermined real object from the second image; and performing predetermined processing based on a result of the detection of the predetermined real object.

The present invention in its third aspect provides a non-transitory computer readable medium that stores a program, wherein the program causes a computer to execute a control method of a head mounted display of a video see-through type, the control method including: executing, in parallel, capturing of a first image representing a real space, and capturing of a second image representing the real space with an image sensor; displaying the first image; detecting a predetermined real object from the second image; and performing predetermined processing based on a result of the detection of the predetermined real object.

Further features of the present invention will become apparent from the following description of exemplary embodiments with reference to the attached drawings.

DESCRIPTION OF THE EMBODIMENTS

In the technique disclosed in Japanese Patent Application Publication No. 2004-205711, the first camera and the second camera are installed at different positions, hence an image captured by the first camera and an image captured by the second camera have parallax. This means that in order to accurately estimate a position of a hand in an image captured by the first camera, a complicated arithmetic operation considering the parallax is required. Since this complicated processing causes a delay in the display of a CG, unintended positional deviation is generated between the hand and the CG in an image to be displayed. If the parallax is not considered, the position of the hand in the image captured by the first camera cannot be estimated accurately. In this case as well, unintended positional deviation is generated between the hand and the CG in the image to be displayed. Such unintended positional deviation causes discomfort to the user. Therefore, in the present embodiment, a first image used for display and a second image used for detecting a predetermined real object are acquired by the same image pickup element (image sensor), whereby parallax between the first image and the second image is eliminated.

Embodiment 1

Figures 1A, 1B:
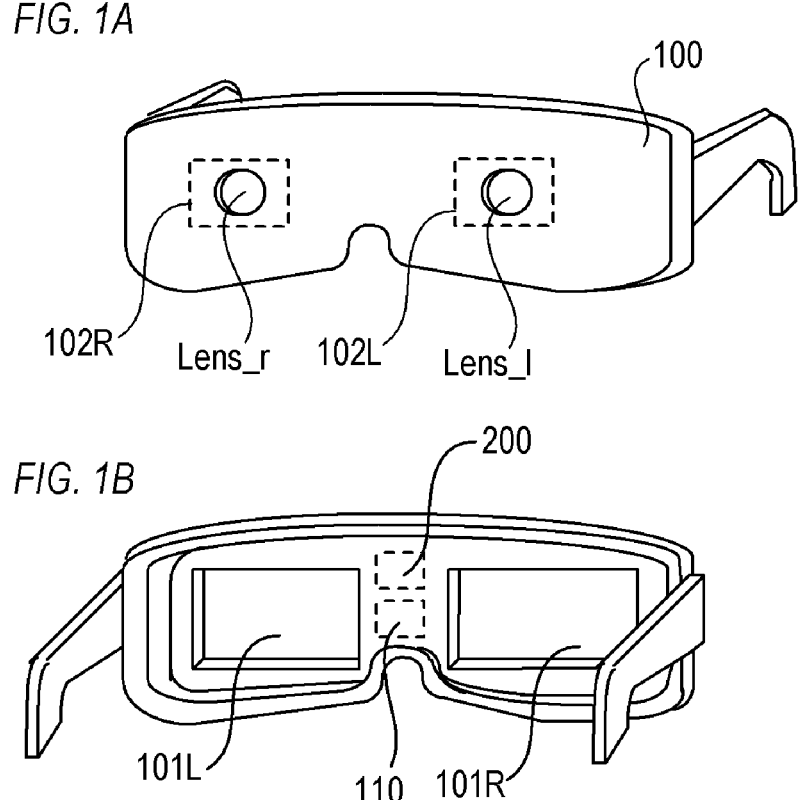
FIGS. 1A and 1B are external views of a head mounted display (HMD)

Embodiment 1 will be described. FIGS. 1A and 1B are external views of a head mounted display 100 according to Embodiment 1. The head mounted display 100 is a video see-through type head mounted display (HMD), and provides a user an augmented reality space, generated by superimposing a virtual space on a real space. Hereafter the head mounted display 100 will be called HMD 100. FIG. 1A is a front face perspective view depicting the HMD 100 opposite the side facing the eyes of the user when mounted on the head of the user, and FIG. 1B is a rear face perspective view depicting the HMD 100 on the side facing the eyes of the user when mounted on the head of the user.

The HMD 100 has a spectacles shape. The HMD 100 includes an optical system Lens_r and an optical system Lens_l, image pickup elements 102R and 102L, an image processing unit 200, display devices 101R and 101L, and a control unit 110.

The optical system Lens_r forms an image of light from the real space on the image pickup element 102R. The optical system Lens_l forms an image of light from the real space on the image pickup element 102L.

The image pickup element 102R is an image pickup element that captures an image (picture, moving image) of a real space (e.g., portion corresponding to a visual field (field-of-view) of the right eye of the user wearing the HMD 100 on their head), and converts the light from the optical system Lens_r into the image data, and outputs the image data. The image pickup element 102L is an image pickup element that captures an image (picture, moving image) of a real space (e.g., portion corresponding to a visual field (field-of-view) of the left eye of the user wearing the HMD 100 on their head), and converts the light from the optical system Lens_l into the image data, and outputs the image data. Each of the image pickup element 102R and image pickup element 102L can execute imaging (capturing) of a first image representing the real space and imaging of a second image representing the real space in parallel. The first image is used for display, and the second image is used for detecting a predetermined real object (e.g., hand).

The image processing unit 200 performs various processing (e.g., detection of a predetermined real object, synthesis (combine) of the graphic with the first image) using the image data outputted from the image pickup element 102R and the image pickup element 102L.

The display device 101R displays (presents) an image outputted from the image processing unit 200 (e.g., image generated by synthesizing the real space and the virtual space) to the right eye of the user wearing the HMD 100 on their head. The display device 101L displays (presents) an image outputted from the image processing unit 200 (e.g., image generated by synthesizing the real space and the virtual space) to the left eye of the user wearing the HMD 100 on their head. In Embodiment 1, each of the display devices 101R and 101L is a display panel (e.g., liquid crystal panel or organic EL panel) which has a display surface facing the eye of the user wearing the HMD 100 on their head, and displays an image on this display surface. Each of the display devices 101R and 101L is not limited to this, but may be a projection device which projects an image on a projection surface facing the eye of the user wearing the HMD 100 on their head, for example. Further, each of the display devices 101R and 101L may be a retinal projection device which projects an image directly to the retina of the eye of the user wearing the HMD 100 on their head.

The control unit 110 controls the HMD 100 in general.

Figure 2:
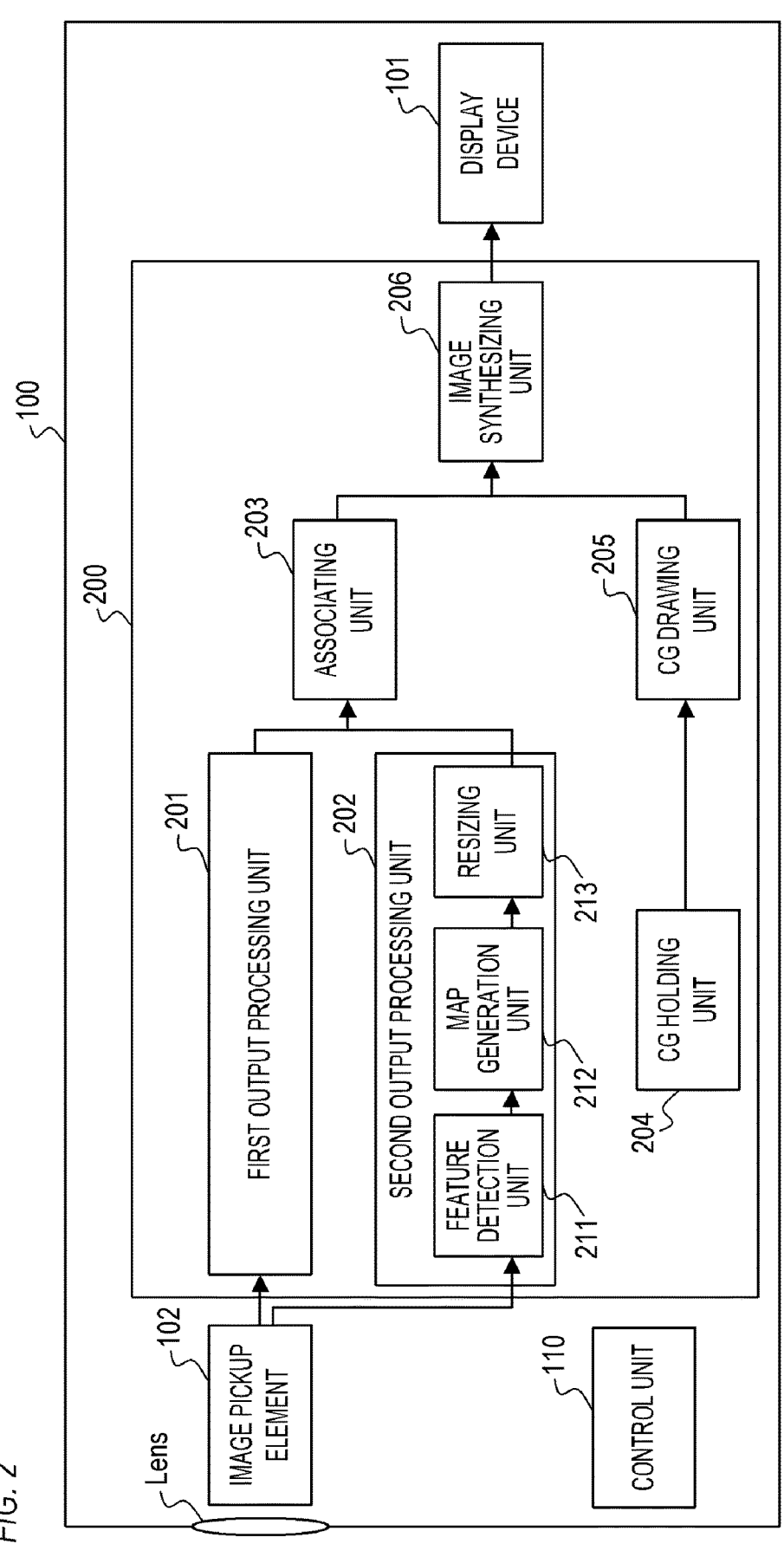
FIG. 2 is a block diagram depicting a configuration of the HMD.

FIG. 2 is a block diagram depicting a configuration of the HMD 100. FIG. 2 indicates only one of the configuration for the right eye and the configuration for the left eye. The HMD 100 includes the configuration indicated in FIG. 2 as the configuration for the right eye and the configuration for the left eye respectively. In the case of interpreting the optical system Lens in FIG. 2 as the optical system Lens_r, the image pickup element 102 is interpreted as the image pickup element 102R, and the display device 101 is interpreted as the display device 101R. In the case of interpreting the optical system Lens as the optical system Lens_l, the image pickup element 102 is interpreted as the image pickup element 102L, and the display device 101 is interpreted as the display device 101L.

The optical system Lens forms an image of the light from the real space (object) on the image pickup element 102. The image pickup element 102 converts the light from the optical system Lens into image data, and outputs the image data to the image processing unit 200. The image processing unit

200 includes a first output processing unit 201, a second output processing unit 202, an associating unit 203, a CG holding unit 204, a CG drawing unit 205, and an image synthesizing unit 206. The image pickup element 102 outputs the first image (image data) representing the real space to the first output processing unit 201, and outputs the second image (image data) representing the real space to the second output processing unit 202. As mentioned above, the first image is used for display, and the second image is used for detecting a predetermined real object (e.g., hand).

The first output processing unit 201 and the second output processing unit 202 perform general correction processing and image processing (e.g., output characteristic correction of the image pickup element 102). Further, the second output processing unit 202 performs processing for detecting a predetermined real object (e.g., hand) from the second image. The second output processing unit 202 includes a feature detection unit 211, a map generation unit 212, and a resizing unit 213. The feature detection unit 211 detects features (characteristics) of a predetermined real object from the second image. For example, the feature detection unit 211 detects feature points (e.g., each position of a hand) or feature regions (e.g., beige color region). The map generation unit 212 generates a map of the detection result of the feature detection unit 211. For example, map generation is the generation of a map based on distance, or a map based on color. In the case where a pixel of the image pickup element 102 is laterally divided into 2, the distance may be measured based on the phase difference, whereby a map indicating a distance from the HMD 100 (image pickup element 102) to each feature point may be acquired. For the feature region, a region having a predetermined color (e.g., beige color) may be detected, and a map indicating regions having this predetermined color may be acquired. The resizing unit 213 resizes the map generated by the map generation unit 212, so that a map having a size matching with the size of the first image (image outputted from the first output processing unit 201) can be acquired.

The associating unit 203 associates the map (such features as feature points and feature regions), resized by the resizing unit 213, with the first image (image outputted from the first output processing unit 201). If there is parallax between the first image and the second image, a complicated arithmetic operation considering the parallax are required for the processing group, from the processing for detecting features from the second image to the processing for associating the resized map with the first image. In Embodiment 1, however, the first image and the second image are acquired by the same image pickup element 102, hence there is no parallax between the first image and the second image. Therefore the above processing group can be completed without performing a complicated arithmetic operation, and the first image with which the map is appropriately associated can be acquired.

The CG holding unit 204 holds computer graphics (CG) data. The format of CG data is not especially limited, as long as rendering as CG (images, graphics) is possible.

Based on the detection result of a predetermined real object (e.g., hand), the CG drawing unit 205 and the image synthesizing unit 206 synthesizes the CG with the first image (image outputted from the associating unit 203, a background image). For example, the CG drawing unit 205 acquires the CG data to be drawn from the CG holding unit 204, and generates image data by drawing the CG. The image synthesizing unit 206 synthesizes the CG drawn by the CG drawing unit 205 with the first image (image outputted from the associating unit 203, a background image), based on the map (such features as feature points and feature regions) associated with the first image. Thereby a synthesized image (image data) is generated. The image synthesizing unit 206 outputs the generated synthesized image to the display device 101. The map associated with the first image may be considered when the CG drawing unit 205 draws the CG.

The predetermined processing based on the detection result of the predetermined real object is not limited to the synthesis of the CG. For example, the predetermined processing may be a processing for receiving a gesture operation. For the predetermined real object, markers may be detected, and the position and attitude of the HMD 100 may be detected (estimated) based on the detection result of the markers.

The display device 101 displays the synthesized image generated by the image synthesizing unit 206. The processing for the image synthesizing unit 206 to output the synthesized image (image data) to the display device 101 may be regarded as display control to display the synthesized image on the display device 101.

Figure 3:
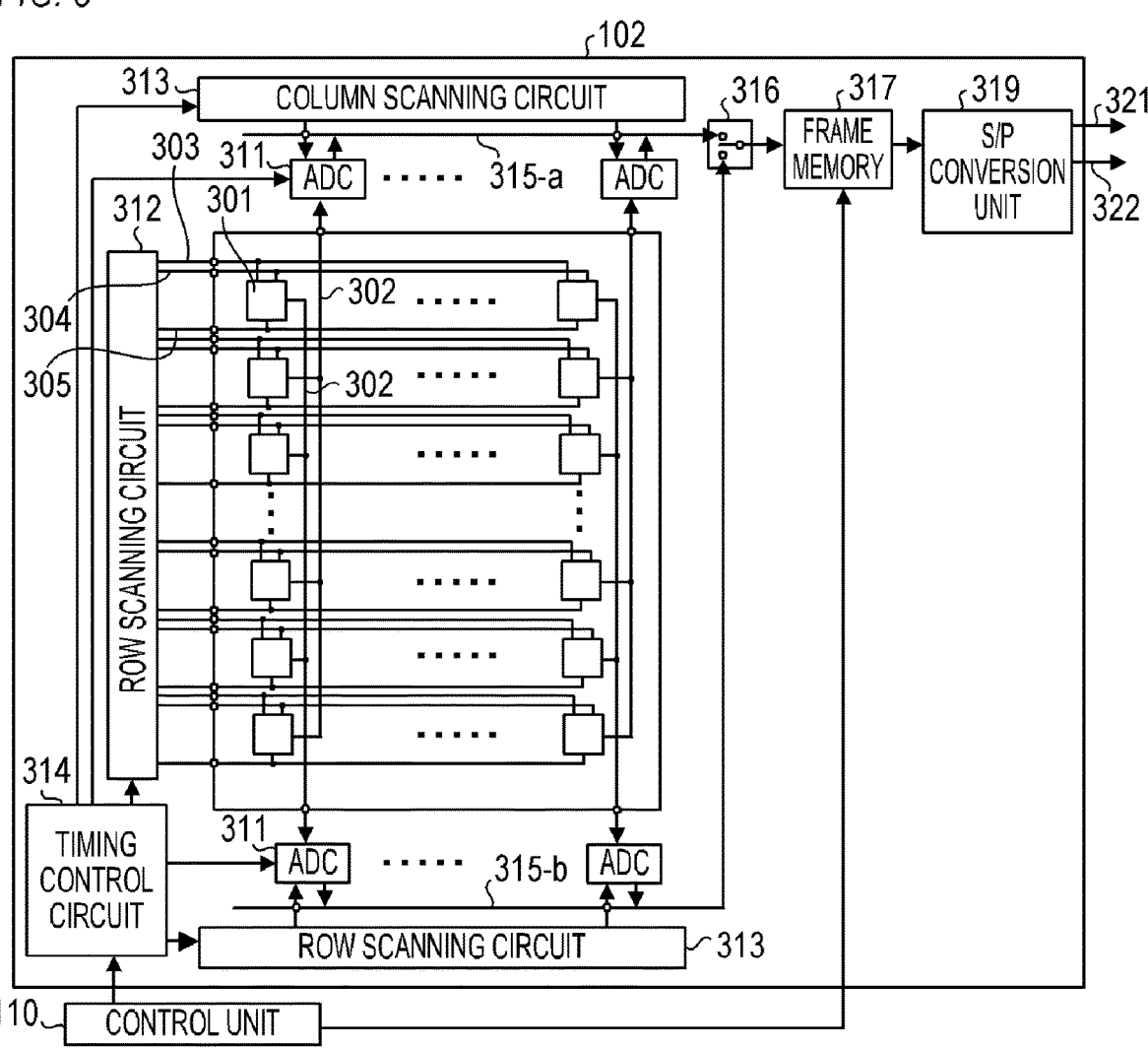
FIG. 3 is a block diagram depicting a configuration of an image pickup element.

FIG. 3 is a block diagram depicting a configuration of the image pickup element 102.

The image pickup element 102 includes a plurality of pixels 301 which are arrayed in a matrix. For each of a plurality of rows, the plurality of pixels 301 disposed in the row direction (horizontal direction) are connected to a transfer signal line 303, a rest signal line 304 and a row selection signal line 305 respectively. For each of a plurality of columns, the plurality of pixels disposed in the column direction (vertical direction) are connected to a vertical output line 302 respectively.

The image pickup element 102 includes a column analog-to-digital converter (ADC) 311, a row scanning circuit 312, a column scanning circuit 313, and a timing control circuit (pixel driving circuit) 314. The image pickup element 102 also includes a selection switch 316, a frame memory 317, and a serial-to-parallel (S/P) conversion unit 319.

The row scanning circuit 312 sequentially selects a row of the plurality of pixels 301 arrayed in a matrix. The column ADC 311 converts a pixel signal (analog signal) outputted from a pixel 301 of a selected row into pixel data (digital signal). The column scanning circuit 313 reads image data (plurality of pixel data) from a plurality of column ADCs 311. The timing control circuit 314 is controlled by the control unit 110, and controls the column ADC 311, the row scanning circuit 312 and the column scanning circuit 313. In FIG. 3, out of the plurality of pixels 301 disposed in the column direction (vertical direction), 2 types of vertical output lines 302, that is, the vertical output line 302 to which pixels 301 on odd rows are connected, and a vertical output line 302 to which pixels 301 on even rows are connected, are used. Accordingly, 2 types of column ADCs 311 and 2 types of column scanning circuits 313 are used. The image data corresponding to the plurality of pixels 301 on even rows is read to the horizontal signal line 315-a, and the image data corresponding to the plurality of pixels 301 on odd rows is read to the horizontal signal line 315-b.

The selection switch 316 is a switch to select one of: the image data read to the horizontal signal line 315-a and the image data read to the horizontal signal line 315-b, and outputs the selected image data to the frame memory 317. The frame memory 317 is controlled by the control unit 110, temporarily stores the image data outputted by the selection switch 316, and outputs the stored image data to the S/P conversion unit 319. The S/P conversion unit 319 performs S/P conversion on the image data outputted (read) from the frame memory 317, so as to acquire 2 image data (first image and second image). The S/P conversion unit 319 outputs the first image as a main stream 321 to the first output processing unit 201 via a first lane, and outputs the second image as a sub-stream 322 to the second output processing unit 202 via a second lane.

For example, the main stream 321 (first image) and the sub-stream 322 (second image) are imaged such that the imaging period of the sub-stream 322 becomes shorter than the imaging period of the main stream 321. For example, the main stream 321 is imaged by a ⅓ thinning read driving in the vertical direction, and the sub-stream 322 is imaged by a ⅑ thinning read driving in the vertical direction. Thereby the sub-stream 322 is imaged at a lower resolution that the resolution of the main stream 321 (a ⅓ resolution of the main stream 321). In this case, the imaging range of the sub-stream 322 is approximately the same as the imaging range of the main stream 321.

The method for reducing the resolution is not especially limited, and a horizontal addition, for example, may be performed. In the case where regions where a predetermined real object may exist are limited, or where regions synthesized with CG are limited, a part of the imaging range of the main stream 321 may be used as the imaging range of the sub-stream 322. For the main stream 321 and the sub-stream 322, the same pixels may be used, or different pixels may be used. For example, a photoelectric conversion portion of the pixel 301 may have a laminated structure (e.g. laminated structure of a photoelectric conversion film and a photo-diode), and a pixel signal of the main stream 321 and a pixel signal of the sub-stream 322 may be independently outputted from the pixel 301. In the case of acquiring the distance map, the main stream 321 may be acquired using regular pixels, and the sub-stream 322 may be acquired using pixels with which distance measurement is easy (e.g., pixels for which infrared light is detected). Imaging settings may be different between the main stream 321 and the sub-stream 322.

Figure 4:
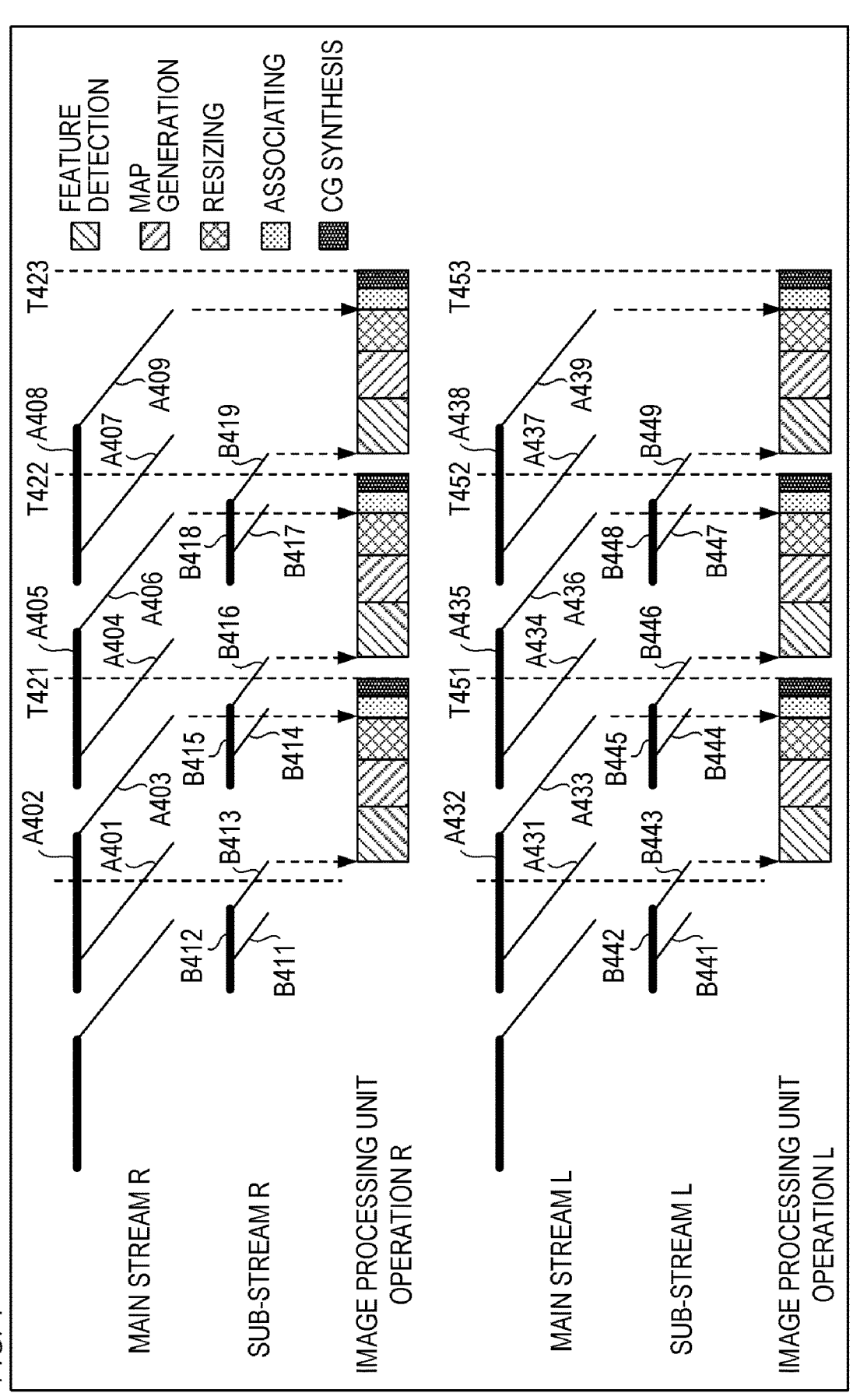
FIG. 4 is a conceptual diagram depicting an operation according to Embodiment 1.

FIG. 4 is a conceptual diagram depicting an operation of the HMD 100. Each processing in FIG. 4 is performed largely in accordance with the instruction received from the control unit 110. For example, each processing in FIG. 4 is performed by the control unit 110 controlling each component of the HMD 100 in accordance with a predetermined control program stored in a storage unit (not illustrated).

An operation on the right eye side will be described. The control unit 110 controls the image pickup element 102R, so that resetting A401, A404, A407, storing A402, A405, A408 and reading A403, A406, A409 are performed. "Resetting" refers to the resetting charges in the plurality of pixels 301, "storing" refers to the storing charges in the plurality of pixels 301, and "reading" refers to reading image data from the plurality of column ADCs 311. Thereby image data in each frame of the main stream (main stream R) is acquired sequentially. The image data of the main stream R is sent to the first output processing unit 201 of the image processing unit 200 via the selection switch 316, the frame memory 317, and the S/P conversion unit 319.

Operation for the sub-stream (sub-stream R) is also performed in parallel with the above operation for the main stream R. The control unit 110 controls the image pickup element 102R, so that resetting B411, B414, B417, storing B412, B415, B418, and reading B413, B416, B419 are performed. Thereby image data in each frame of the sub-stream R is acquired sequentially. The image data of the sub-stream R is sent to the second output processing unit 202 of the image processing unit 200 via the selection switch 316, the frame memory 317 and the S/P conversion unit 319.

The imaging period of the sub-stream R is shorter than the imaging period of the main stream R. For example, the period of resetting B411, B414, B417 of the sub-stream R is shorter than the period of resetting A401, A404, A407 of the main stream R. The period of storing B412, B415, B418 of the sub-stream R is shorter than the period of storing A402, A405, A408 of the main stream R. The period of reading B413, B416, B419 of the sub-stream R is shorter than the period of reading A403, A406, A409 of the main stream R.

In FIG. 4, the storing B412, B415, B418 of the sub-stream R is performed partially in the period of storing A402, A405, A408 of the main stream R. Thereby the main stream R and the sub-stream R having a short time lag can be acquired.

The second output processing unit 202 performs the processing for detecting a predetermined real object from the sub-stream R (detection of features, generation of map, and resizing of map). In FIG. 4, imaging of one frame of the sub-stream R (reading B413, B416 and B419 of the sub-stream R) completes before imaging of one frame of the main stream R (reading A403, A406 and A409 of the main stream R) completes. The processing for detecting a predetermined real object from the sub-stream R (detection of features, generation of map, resizing of map) completes before imaging of one frame of the main stream R (reading A403, A406 and A409 of the main stream R) completes. Thereby delay that is generated between imaging and display can be reduced compared with the configuration where the predetermined real object is detected after both imaging of one frame of the main stream R and imaging of one frame of the sub-stream R complete. The processing for detecting the predetermined real object from the sub-stream R (detection of features, generation of map, resizing of map) may at least partially overlap with the period of reading A403, A406, A409 of the main stream R.

Then the main stream R is inputted to the associating unit 203 via the first output processing unit 201, and the resized map is inputted from the second output processing unit 202 to the associating unit 203. The associating unit 203 associates the resized map with the main stream. The image synthesizing unit 206 generates a synthesized image (image data) by synthesizing a CG drawn by the CG drawing unit 205 with the main stream (background image) outputted from the associating unit 203, and outputs the synthesized image to the display device 101R. These operations are performed during the blanking period of the main stream R (period from the end of reading A403, A406 and A409 of the main stream R to update of the display T421, T422 and T423).

An operation on the left eye side will be described. The control unit 110 controls the image pickup element 102L so that resetting A431, A434, A437, storing A432, A435, A438 and reading A433, A436, A439 are performed. Thereby image data in each frame of the main stream (main stream L) is acquired sequentially. The image data of the main stream L is sent to the first output processing unit 201 of the image processing unit 200 via the selection switch 316, the frame memory 317, and the S/P conversion unit 319.

Operation for the sub-stream (sub-stream L) is also performed in parallel with the above operation for the main stream L. The control unit 110 controls the image pickup element 102L so that resetting B441, B444, B447, storing B442, B445, B448 and reading B443, B446, B449 are performed. Thereby image data in each frame of the sub-stream L is acquired sequentially. The image data of the sub-stream L is sent to the second output processing unit 202 of the image processing unit 200 via the selection switch 316, the frame memory 317, and the S/P conversion unit 319.

The imaging period of the sub-stream L is shorter than the imaging period of the main stream L. For example, the period of resetting B441, B444, B447 of the sub-stream L is shorter than the period of resetting A431, A434, A437 of the main stream L. The period of storing B442, B445, B448 of the sub-stream L is shorter than the period of storing A432, A435, A438 of the main stream L. The period of reading B443, B446, B449 of the sub-stream L is shorter than the period of reading A433, A436, A439 of the main stream L.

In FIG. 4, the storing B442, B445, B448 of the sub-stream L is performed partially in the period of storing A432, A435, A438 of the main stream L. Thereby the main stream L and the sub-stream L having a short time lag can be acquired.

The second output processing unit 202 performs the processing for detecting a predetermined real object from the sub-stream L (detection of features, generation of map, and resizing of map). In FIG. 4, imaging of one frame of the sub-stream L (reading B443, B446 and B449 of the sub-stream L) completes before imaging of one frame of the main stream L (reading A433, A436 and A439 of the main stream L) completes. The processing for detecting a predetermined object from the sub-stream L (detection of features, generation of map, and resizing of map) completes before imaging of one frame of the main stream L (reading A433, A436 and A439 of the main stream L) completes. Thereby delay that is generated between imaging and display can be reduced compared with the configuration where the predetermined real object is detected after both imaging of one frame of the main stream L and imaging of one frame of the sub-stream L complete. The processing for detecting the predetermined real object from the sub-stream L (detection of features, generation of map, and resizing of map) may at least partially overlap with the period of reading A433, A436, A439 of the main stream L.

Then the main stream L is inputted to the associating unit 203 via the first output processing unit 201, and the resized map is inputted from the second output processing unit 202 to the associating unit 203. The associating unit 203 associates the resized map with the main stream. The image synthesizing unit 206 generates a synthesized image (image data) by synthesizing a CG drawn by the CG drawing unit 205 with the main stream (background image) outputted from the associating unit 203, and outputs the synthesized image to the display device 101L. These operations are performed during the blanking period of the main stream L (period from the end of reading A433, A436 and A439 of the main stream L to update of the display T451, T452 and T453).

Figure 5:
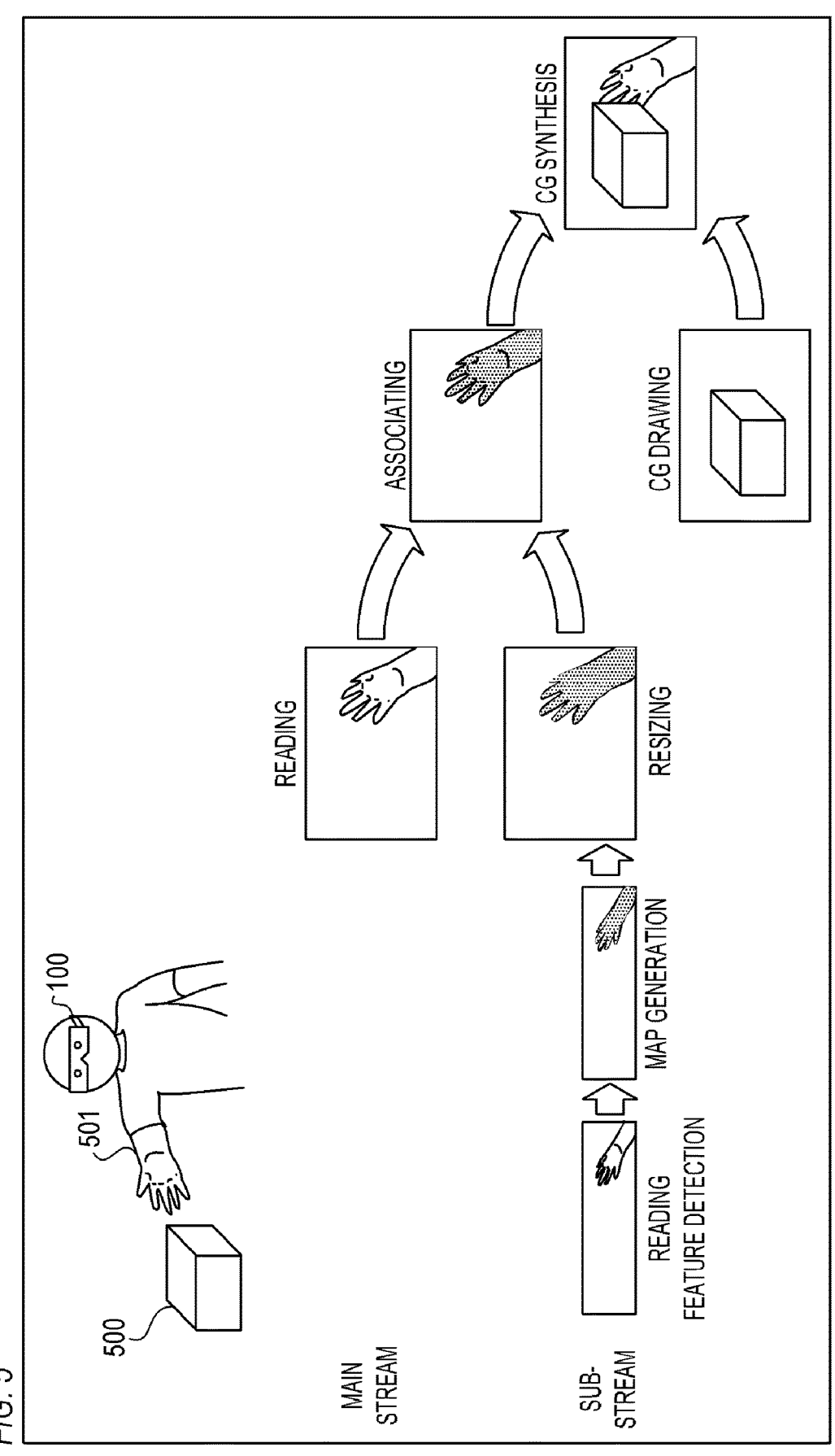
FIG. 5 is an image diagram depicting an operation of the HMD.

FIG. 5 is an image diagram depicting an operation of the HMD 100 (operation in FIG. 4). Here an example when a user wearing the HMD 100 performs an action to hold a box 500 (virtual object) of a CG with their hand 501 will be described.

First, the second output processing unit 202 (feature detection unit 211) detects features of the hand 501 from an image of the sub-stream that was read. For example, regions of beige color are detected. The second output processing unit 202 (map generation unit 212) generates a distance map based on the detected regions of beige color. Then the second output processing unit 202 (resizing unit 213) resizes the generated distance map so that a distance map of a size matching with the size of the image of the main stream can be acquired. Reading of the image of the main stream completes after a timing when this processing ends.

Then the associating unit 203 associates the resized distance map with the image of the main stream that was read. The CG drawing unit 205 acquires the box 500 (CG) to be drawn from the CG holding unit 204, and draws an image of the box 500 in parallel with the processing thus far.

Then based on the distance map associated with the image of the main stream (background image) outputted from the associating unit 203, the image synthesizing unit 206 synthesizes the box 500 drawn by the CG drawing unit 205 with the image of the main stream. Thereby a synthesized image is generated. For example, to generate the synthesized image, a superimposed region of the box 500 and the hand 501 is detected based on the distance map, and a portion where the hand 501 exists on the front side (side closer to the HMD 100) of the box 500 is masked, so that the box 500 is not drawn, and only the hand 501 becomes visible in this portion. Thereafter the image synthesizing unit 206 outputs the generated synthesized image to the display device 101.

As described above, according to Embodiment 1, the first image used for display and the second image used for detecting a predetermined real object are acquired by the same image pickup element, hence there is no parallax between the first image and the second image. Therefore the first image with which the map is appropriately associated can be acquired quickly without performing a complicated arithmetic operation. As a result, the processing based on the position of the real object in the image to be displayed can be performed appropriately. Furthermore, the imaging period of the second image is shorter than the imaging period of the first image, and detection of the predetermined real object completes before the imaging of the first image completes. Thereby delay that is generated between imaging and display can be further reduced.

Embodiment 2

Embodiment 2 of the present invention will be described next. In the following, description on the same aspects as Embodiment 1 (e.g., same configuration and processing as Embodiment 1) will be omitted, and aspects different from Embodiment 1 will be described.

In Embodiment 1, an example of performing the operation on the right eye side and the operation on the left eye side in a same phase was described. But in some cases, if the operation on the right eye side and the operation on the left eye side are performed in a same phase, detailed movements of a predetermined real object (e.g., hand) may not be captured. For example, if the operation on the right eye side and the operation on the left eye side are performed in a same phase at 60 fps, the predetermined real object is detected at a frequency of 60 fps, which means that detailed movements of the predetermined real object cannot be captured in a 1/60 second period. Therefore in Embodiment 2, the operation on the right eye side and the operation on the left eye side are performed in different phases. Thereby detailed movements of a predetermined real object (e.g., hand) can be captured. For example, in the case of performing the operation on the right eye side and the operation on the left eye side at 60 fps, the phase of the operation on the left eye side is shifted from the phase of the operation on the left eye side by 1/30 of a second. Thereby when both the operation on the right eye side and the operation on the left eye side are performed, the predetermined real object is detected at a frequency of 120 fps, and detailed movements of the predetermined real object can be captured.

Figure 6:
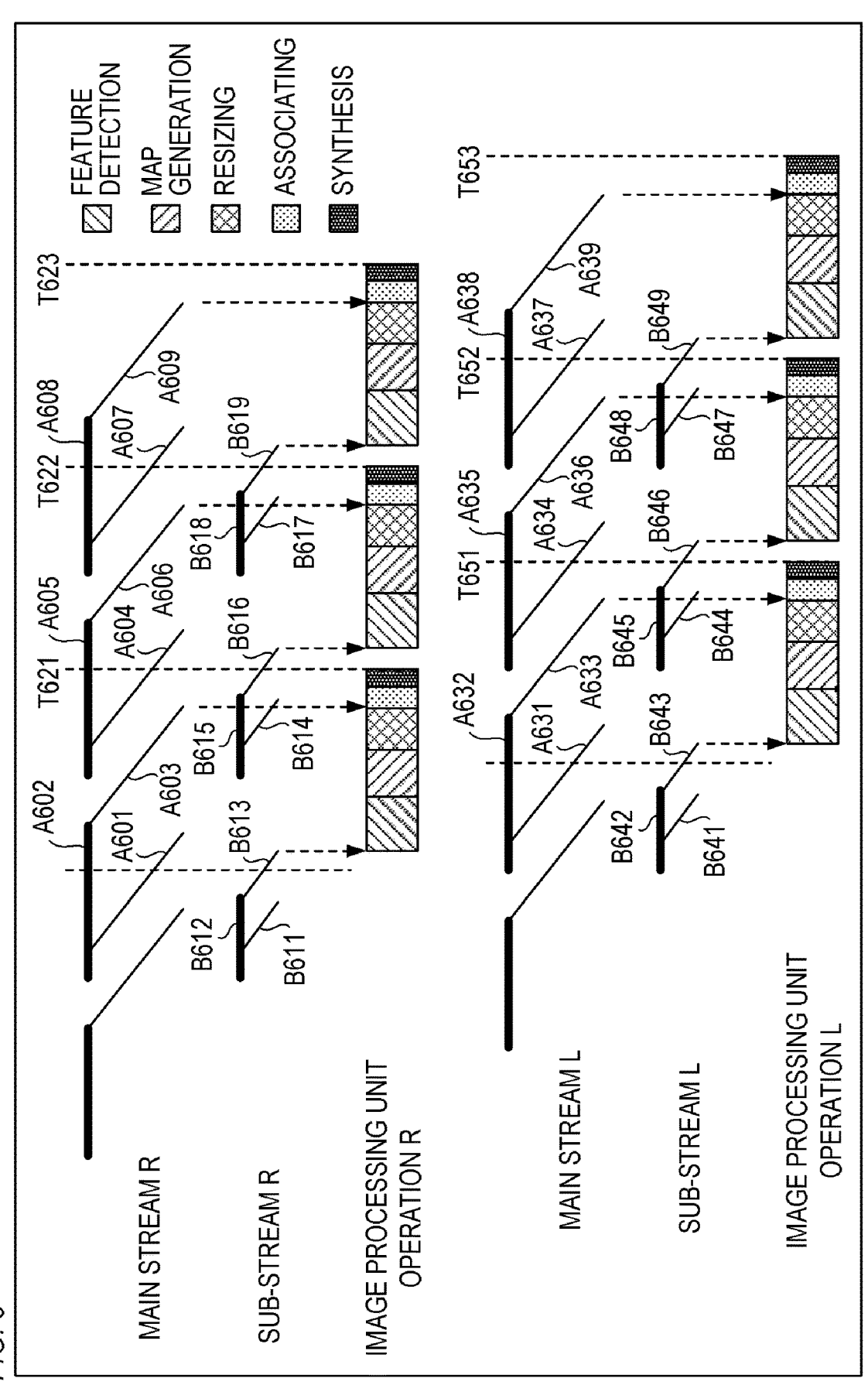
FIG. 6 is a conceptual diagram depicting an operation according to Embodiment 2.

FIG. 6 is a conceptual diagram depicting an operation of the HMD 100. Each processing in FIG. 6 is performed largely in accordance with the instruction received from the control unit 110. For example, each processing in FIG. 6 is performed by the control unit 110 controlling each component of the HMD 100 in accordance with a predetermined control program stored in a storage unit (not illustrated).

An operation on the right eye side will be described. The control unit 110 controls the image pickup element 102R so that resetting A601, A604, A607, storing A602, A605, A608, and reading A603, A606, A609 are performed. Thereby image data in each frame of the main stream (main stream R) is acquired sequentially. The image data of the main stream R is sent to the first output processing unit 201 of the image processing unit 200 via the selection switch 316, the frame memory 317, and the S/P conversion unit 319.

Operation for the sub-stream (sub-stream R) is also performed in parallel with the above operation for the main stream R. The control unit 110 controls the image pickup element 102R so that resetting B611, B614, B617, storing B612, B615, B618, and reading B613, B616, B619 are performed. Thereby image data in each frame of the sub-stream R is acquired sequentially. The image data of the sub-stream R is sent to the second output processing unit 202 of the image processing unit 200 via the selection switch 316, the frame memory 317, and the S/P conversion unit 319.

The imaging period of the sub-stream R is shorter than the imaging period of the main stream R. For example, the period of resetting B611, B614, B617 of the sub-stream R is shorter than the period of resetting A601, A604, A607 of the main stream R. The period of storing B612, B615, B618 of the sub-stream R is shorter than the period of storing A602, A605, A608 of the main stream R. The period of reading B613, B616, B619 of the sub-stream R is shorter than the period of reading A603, A606, A609 of the main stream R.

In FIG. 6, the storing B612, B615, B618 of the sub-stream R is performed partially in the period of storing A602, A605, A608 of the main stream R. Thereby the main stream R and the sub-stream R having a short time lag can be acquired.

The second output processing unit 202 performs the processing for detecting a predetermined real object from the sub-stream R (detection of features, generation of map, resizing of map). In FIG. 6, imaging of one frame of the sub-stream R (reading B613, B616 and B619 of the sub-stream R) completes before imaging of one frame of the main stream R (reading A603, A606 and A609 for the main stream R) completes. The processing for detecting a predetermined real object from the sub-stream R (detection of features, generation of map, and resizing of map) completes before imaging of one frame of the main stream R (reading A603, A606 and A609 of the main stream R) completes. Thereby delay that is generated between imaging and display can be reduced compared with the configuration where the predetermined real object is detected after both imaging of one frame of the main stream R and imaging of one frame of the sub-stream R complete. The processing for detecting the predetermined real object from the sub-stream R (detection of features, generation of map, and resizing of map) may at least partially overlap with the period of reading A603, A606, A609 of the main stream R.

Then the main stream R is inputted to the associating unit 203 via the first output processing unit 201, and the resized map is inputted from the second output processing unit 202 to the associating unit 203. The associating unit 203 associates the resized map with the main stream. The image synthesizing unit 206 generates a synthesized image (image data) by synthesizing a CG drawn by the CG drawing unit 205 with the main stream (background image) outputted from the associating unit 203, and outputs the synthesized image to the display device 101R. These operations are performed during the blanking period of the main stream R (period from the end of reading A603, A606 and A609 of the main stream R to update of the display T621, T622 and T623).

An operation on the left eye side will be described. The control unit 110 controls the image pickup element 102L so that resetting A631, A634, A637, storing A632, A635, A638, and reading A633, A636, A639 are performed. Thereby image data in each frame of the main stream (main stream L) is acquired sequentially. The image data of the main stream L is sent to the first output processing unit 201 of the image processing unit 200 via the selection switch 316, the frame memory 317, and the S/P conversion unit 319.

Operation for the sub-stream (sub-stream L) is also performed in parallel with the above operation for the main stream L. The control unit 110 controls the image pickup element 102L so that resetting B641, B644, B647, storing B642, B645, B648, and reading B643, B646, B649 are performed. Thereby image data in each frame of the sub-stream L is acquired sequentially. The image data of the sub-stream L is sent to the second output processing unit 202 of the image processing unit 200 via the selection switch 316, the frame memory 317, and the S/P conversion unit 319.

The imaging period of the sub-stream L is shorter than the imaging period of the main stream L. For example, the period of resetting B641, B644, B647 of the sub-stream L is shorter than the period of resetting A631, A634, A637 of the main stream L. The period of storing B642, B645, B648 of the sub-stream L is shorter than the period of storing A632, A635, A638 of the main stream L. The period of reading B643, B646, B649 of the sub-stream L is shorter than the period of reading A633, A636, A639 of the main stream L.

In FIG. 6, the storing B642, B645, B648 of the sub-stream L is performed partially in the period of storing A632, A635, A638 of the main stream L. Thereby the main stream L and the sub-stream L having a short time lag can be acquired.

The second output processing unit 202 performs the processing for detecting a predetermined real object from the sub-stream L (detection of features, generation of map, and resizing of map). In FIG. 6, imaging of one frame of the sub-stream L (reading B643, B646 and B649 of the sub-stream L) completes before imaging of one frame of the main stream L (reading A633, A636 and A639 of the main stream L) completes. The processing for detecting a predetermined real object from the sub-stream L (detection of features, generation of map, and resizing of map) completes before imaging of one frame of the main stream L (reading A633, A636 and A639 of the main stream L) completes. Thereby delay that is generated between imaging and display can be reduced compared with the configuration where the predetermined real object is detected after both imaging of one frame of the main stream L and imaging of one frame of the sub-stream L complete. The processing for detecting the predetermined real object from the sub-stream L (detection of features, generation of map, and resizing of map) may at least partially overlap with the period of reading A633, A636, A639 of the main stream L.

Then the main stream L is inputted to the associating unit 203 via the first output processing unit 201, and the resized map is inputted from the second output processing unit 202 to the associating unit 203. The associating unit 203 associates the resized map with the main stream. The image synthesizing unit 206 generates a synthesized image (image data) by synthesizing a CG drawn by the CG drawing unit

205 with the main stream (background image) outputted from the associating unit 203, and outputs the synthesized image to the display device 101L. These operations are performed during the blanking period of the main stream L (period from the end of reading A633, A636 and A639 of the main stream L to update of the display T651, T652 and T653).

In FIG. 6, the operation on the right eye side and the operation on the left eye side are performed in different phases. For example, the resetting A631 is performed in a different phase (at a different timing) from the resetting A601, and the resetting B641 is performed in a different phase from the resetting B641. The storing A632 is performed in a different phase from the storing A602, and the storing B642 is performed in a different phase from the storing B612. The reading A633 is performed in a different phase from the reading A603, and the reading B643 is performed in a different phase from the reading B613. Thereby detailed movements of a predetermined real object (e.g., hand) can be captured.

Embodiment 3

Embodiment 3 of the present invention will be described next. In the following, description on the same aspects as Embodiments 1 and 2 (e.g., same configuration and processing as Embodiments 1 and 2) will be omitted, and aspects different from Embodiments 1 and 2 will be described.

In Embodiment 2, an example, where all the operations on the right eye side and all the operations on the left eye side are performed in different phases, was described. However, the main stream is used for display, and if the operation for the main stream R and the operation for the main stream L are performed in different phases, flickering may be perceived due to the deviation of display timings between the right eye side and the left eye side. Therefore in Embodiment 3, the operation for the main stream R and the operation for the main stream L are performed in a same phase, and the operation for the sub-stream R and the operation for the sub-stream L are performed in different phases. Thereby detailed movements of a predetermined real object (e.g., hand) can be captured, while suppressing flickering of the display.

Figure 7:
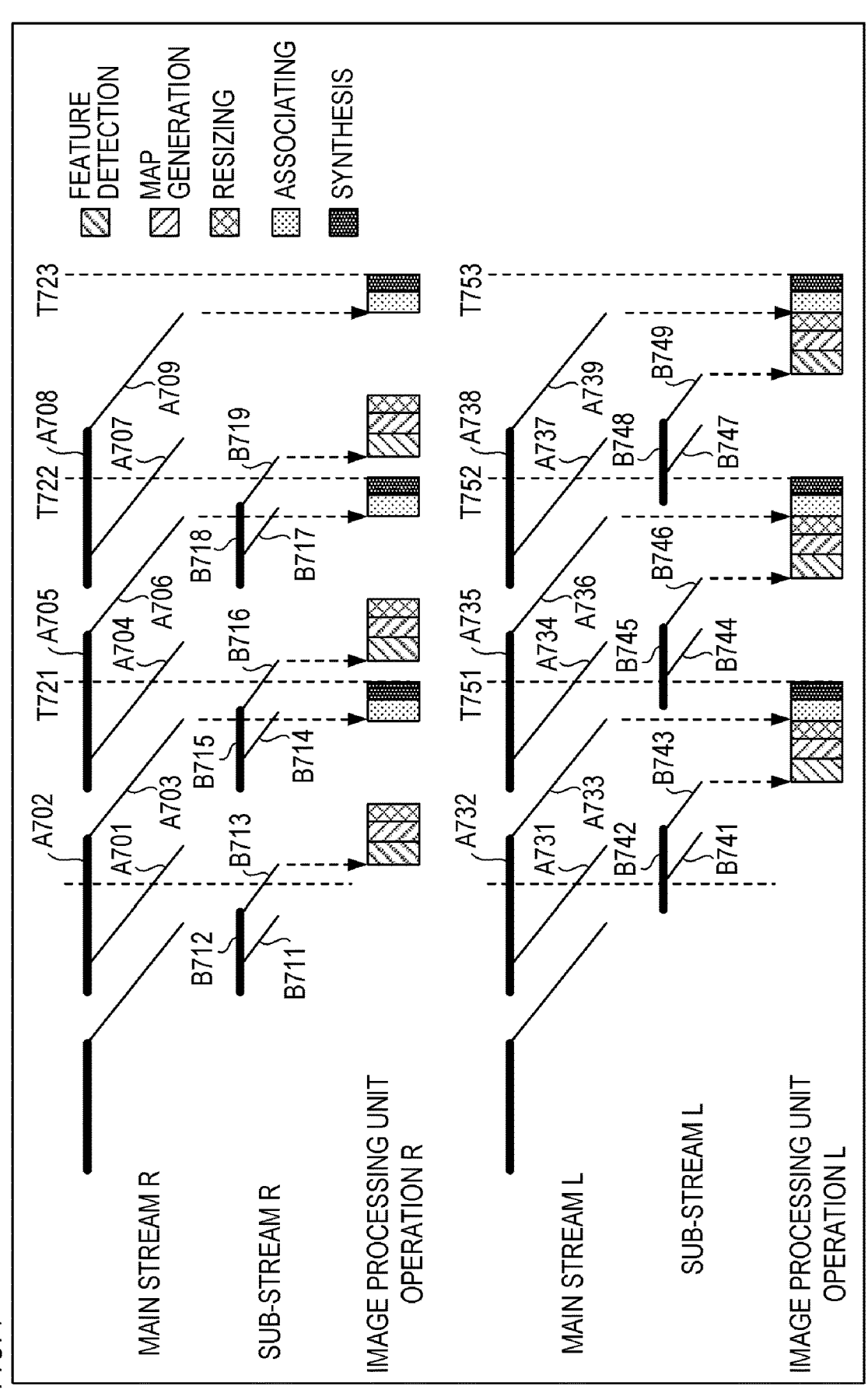
FIG. 7 is a conceptual diagram depicting an operation according to Embodiment 3.

FIG. 7 is a conceptual diagram depicting an operation of the HMD 100. Each processing in FIG. 7 is performed largely in accordance with the instruction received from the control unit 110. For example, each processing in FIG. 7 is performed by the control unit 110 controlling each component of the HMD 100 in accordance with a predetermined control program stored in a storage unit (not illustrated).

An operation on the right eye side will be described. The control unit 110 controls the image pickup element 102R so that resetting A701, A704, A707, storing A702, A705, A708, and reading A703, A706, A709 are performed. Thereby image data in each frame of the main stream (main stream R) is acquired sequentially. The image data of the main stream R is sent to the first output processing unit 201 of the image processing unit 200 via the selection switch 316, the frame memory 317, and the S/P conversion unit 319.

Operation for the sub-stream (sub-stream R) is also performed in parallel with the above operation for the main stream R. The control unit 110 controls the image pickup element 102R so that resetting B711, B714, B717, storing B712, B715, B718, and reading B713, B716, B719 are performed. Thereby image data in each frame of the sub-stream R is acquired sequentially. The image data of the sub-stream R is sent to the second output processing unit 202 of the image processing unit 200 via the selection switch 316, the frame memory 317, and the S/P conversion unit 319.

The imaging period of the sub-stream R is shorter than the imaging period of the main stream R. For example, the period of resetting B711, B714, B717 of the sub-stream R is shorter than the period of resetting A701, A704, A707 of the main stream R. The period of storing B712, B715, B718 of the sub-stream R is shorter than the period of storing A702, A705, A708 of the main stream R. The period of reading B713, B716, B719 of the sub-stream R is shorter than the period of reading A703, A706, A709 of the main stream R.

In FIG. 7, the storing B712, B715, B718 of the sub-stream R is performed partially in the period of storing A702, A705, A708 of the main stream R. Thereby the main stream R and the sub-stream R having a short time lag can be acquired.

The second output processing unit 202 performs the processing for detecting a predetermined real object from the sub-stream R (detection of features, generation of map, and resizing of map). In FIG. 7, imaging of one frame of the sub-stream R (reading B713, B716 an B719 of the sub-stream R) completes before imaging of one frame of the main stream R (reading A703, A706 and A709 of the main stream R) completes. The processing for detecting a predetermined real object from the sub-stream R (detection of features, generation of map, and resizing of map) completes before imaging of one frame of the main stream R (reading A703, A706 and A709 of the main stream R) completes. Thereby delay that is generated between imaging and display can be reduced compared with the configuration where the predetermined real object is detected after both imaging of one frame of the main stream R and imaging of one frame of the sub-stream R complete. The processing for detecting the predetermined real object from the sub-stream R (detection of features, generation of map, and resizing of map) may at least partially overlap with the period of reading A703, A706, A709 for the main stream R.

Then the main stream R is inputted to the associating unit 203 via the first output processing unit 201, and the resized map is inputted from the second output processing unit 202 to the associating unit 203. The associating unit 203 associates the resized map with the main stream. The image synthesizing unit 206 generates a synthesized image (image data) by synthesizing a CG drawn by the CG drawing unit 205 with the main stream (background image) outputted from the associating unit 203, and outputs the synthesized image to the display device 101R. These operations are performed during the blanking period of the main stream R (period from the end of reading A703, A706 and A709 of the main stream R to update of the display T721, T722 and T723).

An operation on the left eye side will be described. The control unit 110 controls the image pickup element 102L so that resetting A731, A734, A737, storing A732, A735, A738, and reading A733, A736, A739 are performed. Thereby image data in each frame of the main stream (main stream L) is acquired sequentially. The image data of the main stream L is sent to the first output processing unit 201 of the image processing unit 200 via the selection switch 316, the frame memory 317, and the S/P conversion unit 319.

Operation for the sub-stream (sub-stream L) is also performed in parallel with the above operation for the main stream L. The control unit 110 controls the image pickup element 102L so that resetting B741, B744, B747, storing B742, B745, B748, and reading B743, B746, B749 are performed. Thereby image data in each frame of the sub-stream L is acquired sequentially. The image data of the sub-stream L is sent to the second output processing unit 202 of the image processing unit 200 via the selection switch 316, the frame memory 317, and the S/P conversion unit 319.

The imaging period of the sub-stream L is shorter than the imaging period of the main stream L. For example, the period of resetting B741, B744, B747 of the sub-stream L is shorter than the period of resetting A731, A734, A737 of the main stream L. The period of storing B742, B745, B748 of the sub-stream L is shorter than the period of storing A732, A735, A738 of the main stream L. The period of reading B743, B746, B749 of the sub-stream L is shorter than the period of reading A733, A736, A739 of the main stream L.

In FIG. 7, the storing B742, B745, B748 of the sub-stream L is performed partially in the period of storing A732, A735, A738 of the main stream L. Thereby the main stream L and the sub-stream L having a short time lag can be acquired.

The second output processing unit 202 performs processing for detecting a predetermined real object from the sub-stream L (detection of features, generation of map, and resizing of map). In FIG. 7, imaging of one frame of the sub-stream L (reading B743, B746 and B749 of the sub-stream L) completes before imaging of one frame of the main stream L (reading A733, A736 and A739 of the main stream L) completes. The processing for detecting a predetermined real object from the sub-stream L (detection of features, generation of map, and resizing of map) completes before imaging of one frame of the main stream L (reading A733, A736 and A739 of the main stream L) completes. Thereby delay that is generated between imaging and display can be reduced compared with the configuration where the predetermined real object is detected after both imaging of one frame of the main stream L and imaging of one frame of the sub-stream L complete. The processing for detecting the predetermined real object from the sub-stream L (detection of features, generation of map, and resizing of map) may at least partially overlap with the period of reading A733, A736, A739 of the main stream L.

Then the main stream L is inputted to the associating unit 203 via the first output processing unit 201, and the resized map is inputted from the second output processing unit 202 to the associating unit 203. The associating unit 203 associates the resized map with the main stream. The image synthesizing unit 206 generates a synthesized image (image data) by combining a CG drawn by the CG drawing unit 205 with the main stream (background image) outputted from the associating unit 203, and outputs the synthesized image to the display device 101L. These operations are performed during the blanking period of the main stream L (period from the end of reading A733, A736 and A739 of the main stream L to update of the display T751, T752 and T753).

In FIG. 7, the operation for the main stream R and the operation for the main stream L are performed in a same phase, and the operation for the sub-stream R and the operation for the sub-stream L are performed in different phases. For example, the resetting A731 and the resetting A701 are performed in the same phase (at a same timing), and the resetting B741 and the resetting B711 are performed in different phases. The storing A732 and the storing A702 are performed in a same phase, and the storing B742 and the storing B712 are performed in different phases. The reading A733 and the reading A703 are performed in a same phase, and the reading B743 and the reading B713 are performed in different phases. Thereby detailed movements of a predetermined real object (e.g., hand) can be captured, while suppressing flickering of the display.

In FIG. 6 (Embodiment 2), the storing of the main stream and the storing of the sub-stream are started at a same timing, hence the main stream and the sub-stream having a very short time lag can be acquired. In FIG. 7 (Embodiment 3), on the other hand, the storing A732, A735, A738 of the main stream L and the storing B742, B745, B748 of the sub-stream L are started at different timings. Hence the time lag between the main stream L and the sub-stream L may become longer than the case of FIG. 6 (Embodiment 2). Further, on the left eye side, an unintended positional deviation may be generated between a predetermined real object (e.g., hand) and the CG due to this time lag. However, the storing A702, A705, A708 of the main stream R and the storing B712, B715, B718 of the sub-stream R are started at a same timing, hence on the right eye side, an unintended positional deviation is not generated (or a very minor deviation is generated) between the predetermined real object and the CG. As a consequence, the unintended positional deviation between the predetermined real object and the CG on the left eye side is not perceived very much by the user.

Furthermore, in FIG. 7, the reading B743, B746, B749 of the sub-stream L is performed in a part of the period of reading A733, A736, A739 of the main stream L. Therefore for a part of a row of the plurality of pixels 301, the reading of the main stream L and the reading of the sub-stream L are performed at a same timing. This kind of operation (simultaneous reading) can be implemented by a known method, such as adding vertical output lines.

The above embodiments (including modifications) are merely examples, and a configuration implemented by appropriately modifying and changing the configurations of the above embodiments within the scope of the spirit of the present invention is also included in the present invention. Further, a configuration implemented by appropriately combining the configurations of the above embodiments is also included in the present invention.

According to the present invention, the processing based on the position for a real object is an image to be displayed can be appropriately performed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-016786, filed on Feb. 7, 2023, which is hereby incorporated by reference herein in its entirety.

What is claimed is:

1. A head mounted display of a video see-through type, the head mounted display comprising:
   an image sensor configured to be able to execute, in parallel and within a same frame period, (1) storing, in a first charge storage path, of signal charges generated by a photoelectric conversion portion and corresponding to a first image representing a real space and (2) storing, in a second charge storage path different from the first charge storage path, of signal charges generated by the photoelectric conversion portion and corresponding to a second image representing the real space;
   a display configured to display the first image;
   a detection unit configured to detect a predetermined real object from the second image; and
   a processor configured to perform predetermined processing based on a result of the detection of the predetermined real object,
   wherein the storing in the second charge storage path of the signal charges generated by the photoelectric conversion portion and corresponding to the second image completes before the storing in the first charge storage path of the signal charges generated by the photoelectric conversion portion and corresponding to the first image completes.

2. The head mounted display according to claim 1, wherein the processor combines a graphic with the first image, based on the result of the detection of the predetermined real object.

3. The head mounted display according to claim 1, wherein the image sensor captures the second image in a shorter imaging period than an imaging period of the first image.

4. The head mounted display according to claim 1, wherein the image sensor captures the second image at a lower resolution than a resolution of the first image.

5. The head mounted display according to claim 4, wherein an imaging range of the second image is substantially same as an imaging range of the first image.

6. The head mounted display according to claim 4, wherein an imaging range of the second image is a part of an imaging range of the first image.

7. The head mounted display according to claim 1, wherein capturing of the second image completes before capturing of the first image completes, and
   wherein processing for the detection unit to detect the predetermined real object from the second image completes before capturing of the first image completes.

8. The head mounted display according to claim 1, wherein capturing of the second image completes before capturing of the first image completes, and wherein at least a part of a period of processing for the detection unit to detect the predetermined real object from the second image overlaps with at least a part of a period for the image sensor to read the first image.

9. The head mounted display according to claim 1, wherein the image sensor includes an image sensor for a right eye and an image sensor for a left eye, wherein a phase in which the first image is captured is different between the image sensor for the right eye and the image sensor for the left eye, and wherein a phase in which the second image is captured is different between the image sensor for the right eye and the image sensor for the left eye.

10. The head mounted display according to claim 1, wherein the image sensor is an image sensor for a right eye, wherein the head mounted display further comprises another image sensor configured to be able to execute, in parallel, capturing of a first image representing a real space, and capturing of a second image representing the real space, wherein the another image sensor is an image sensor for a left eye, wherein a phase in which the first image is captured is same for the image sensor for the right eye and the image sensor for the left eye, and wherein a phase in which the second image is captured is different between the image sensor for the right eye and the image sensor for the left eye.

11. A control method of a head mounted display of a video see-through type, the control method comprising:

executing with an image sensor, in parallel and within a same frame period, (1) storing, in a first charge storage path, of signal charges generated by a photoelectronic conversion portion and corresponding to a first image representing a real space and (2) storing, in a second charge storage path different from the first charge storage path, of signal charges generated by the photoelectric conversion portion and corresponding to a second image representing the real space; displaying the first image;

detecting a predetermined real object from the second image; and performing predetermined processing based on a result of the detection of the predetermined real object, wherein the storing in the second charge storage path of the signal charges generated by the photoelectric conversion portion and corresponding to the second image completes before the storing in the first charge storage path of the signal charges generated by the photoelectric conversion portion and corresponding to the first image completes.

12. A non-transitory computer-readable medium that stores a program, wherein the program causes a computer to execute a control method of a head mounted display of a video see-through type, the control method comprising:

executing with an image sensor, in parallel and within a same frame period, (1) storing, in a first charge storage path, of signal charges generated by a photoelectric conversion portion and corresponding to a first image representing a real space and (2) storing, in a second charge storage path different from the first charge storage path, of signal charges generated by the photoelectric conversion portion and corresponding to a second image representing the real space; displaying the first image;

detecting a predetermined real object from the second image; and performing predetermined processing based on a result of the detection of the predetermined real object, wherein the storing in the second charge storage path of the signal charges generated by the photoelectric conversion portion and corresponding to the second image completes before the storing in the first charge storage path of the signal charges generated by the photoelectric conversion portion and corresponding to the first image completes.

13. The head mounted display according to claim 1, wherein the image sensor is an image pickup element, and wherein there is no parallax between the first image and the second image.

* * * * *